United States Patent
Bonicel et al.

(10) Patent No.: US 7,266,273 B2
(45) Date of Patent: Sep. 4, 2007

(54) METHOD FOR MAKING AN OPTICAL CABLE AND RELATED MACHINE

(75) Inventors: Jean-Pierre Bonicel, Rueil Malmaison (FR); Noel Girardon, Sartrouville (FR)

(73) Assignee: Draka Comteq B.V., Amsterdam (NL)

( * ) Notice: Subject to any disclaimer, the term of this patent is extended or adjusted under 35 U.S.C. 154(b) by 0 days.

(21) Appl. No.: 10/518,051

(22) PCT Filed: Jun. 17, 2003

(86) PCT No.: PCT/FR03/01823
§ 371 (c)(1),
(2), (4) Date: Dec. 16, 2004

(87) PCT Pub. No.: WO03/107061
PCT Pub. Date: Dec. 24, 2003

(65) Prior Publication Data
US 2005/0226572 A1    Oct. 13, 2005

(30) Foreign Application Priority Data
Jun. 17, 2002    (FR) ................... 02 07425

(51) Int. Cl.
*G02B 6/44*    (2006.01)
(52) U.S. Cl. .............. 385/100; 385/109; 385/113
(58) Field of Classification Search ................ 385/103, 385/107, 113
See application file for complete search history.

(56) References Cited

U.S. PATENT DOCUMENTS

| 3,512,611 | A | * | 5/1970 | Hulak ..................... 184/15.1 |
| 4,129,468 | A | | 12/1978 | Knab |
| 4,341,440 | A | | 7/1982 | Trezeguet et al. |
| 4,484,963 | A | * | 11/1984 | Anctil et al. .................. 156/56 |
| 5,448,670 | A | * | 9/1995 | Blew et al. .................. 385/112 |
| 5,536,528 | A | | 7/1996 | Tanaka et al. |
| 5,542,020 | A | * | 7/1996 | Horska ....................... 385/112 |
| 6,205,277 | B1 | | 3/2001 | Mathis et al. |
| 6,389,787 | B1 | | 5/2002 | Greenwood et al. |

\* cited by examiner

Primary Examiner—Michelle R. Connelly-Cushwa
(74) Attorney, Agent, or Firm—Sughrue Mion, PLLC

(57) ABSTRACT

The invention relates to the field of processes for the production of an optical transmission cable as well as to the apparatus for carrying out such a process. The method is a process for producing an optical transmission cable from at least one tube (1) inside of which a plurality of optical fibers (2) are arranged, and strengthening elements (3, 4, 5), one of the said strengthening elements, constituting a central strengthening member (4), being arranged at the center of said cable and certain strengthening elements constituting peripheral strengthening members (3), said tube (1) being twisted about said central strengthening member (4) using a tubular machine so as to form a peripheral layer around said central strengthening member (4), the peripheral strengthening members (3) and the tube (1) having diameters sufficiently close to each other to ensure said peripheral layer is homogeneous.

20 Claims, 2 Drawing Sheets

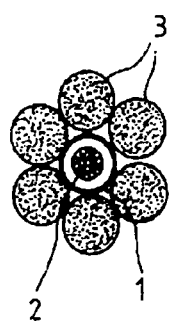
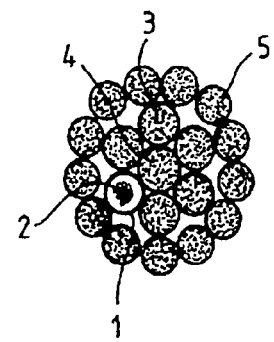
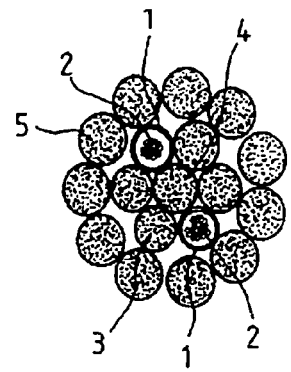
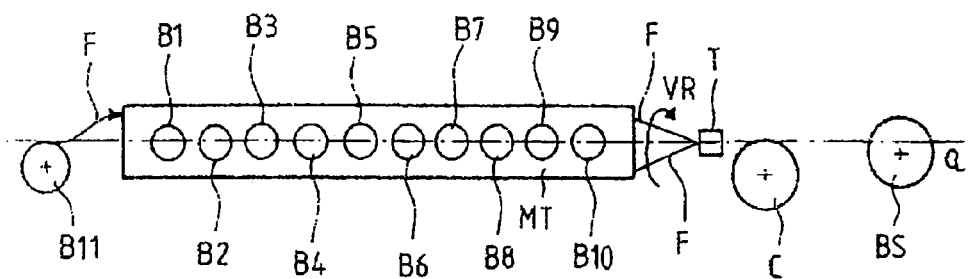
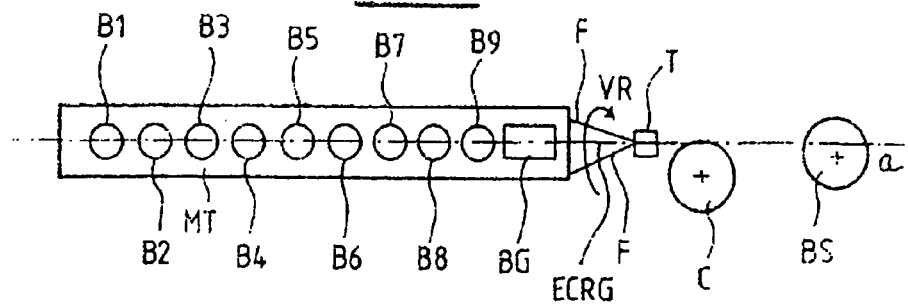

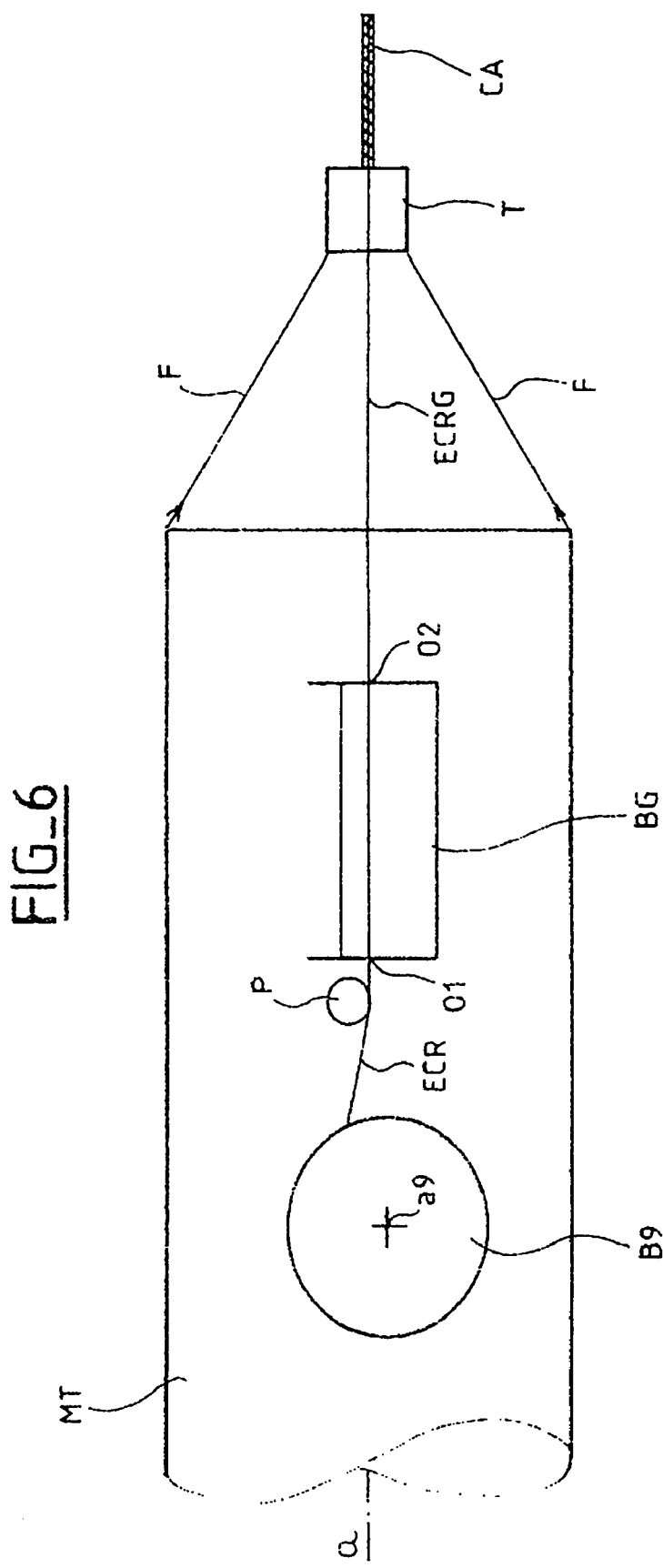
FIG_6

METHOD FOR MAKING AN OPTICAL CABLE AND RELATED MACHINE

CROSS-REFERENCE TO RELATED APPLICATION

This application is a 371 of PCT/FR03/01823 filed Dec. 24, 2003; the disclosure of which is incorporated herein by reference.

The invention is in the field of methods for producing optical transmission cables and apparatus for carrying them out. The optical transmission cables considered are composed, firstly, of one or several tubes each having one or several optical fibers arranged therein and, secondly, strengthening elements based, for example, on metallic wires. The method of the invention is particularly useful for providing aerial or overhead cables.

In the art, it is known to provide cables in which the optical fiber tube occupies a peripheral position. This type of cable which is fairly complex, is obtained using a planetary machine. One disadvantage of the planetary machine is its relatively low production capacity arising through its relatively low maximum speed of rotation.

There is also known in the art the production of cables in which the optical fiber tube has a central position. This type of cable, which is simpler, is provided using either a planetary machine or a tubular machine the productivity of which is much higher than that of a planetary machine as its speed of rotation is much higher. The implementation and operation of such a tubular machine is more complicated and tricky than in a planetary machine meaning that the former is reserved for more complex types of cables.

FIG. 1 shows diagrammatically a cross-section of one example of a cable having a peripheral layer and of which the central element is a tube having several optical fibers. A metallic tube 1 has a set of optical fibers 2. A peripheral layer 3 of strengthening elements surrounds tube 1, the strengthening elements 3 being twisted about tube 1. The cable shown in FIG. 1 is a central tube cable.

The diagrammatic view in FIG. 2 is a profile view of a portion of one example of a cable production line employing a tubular machine. A tubular machine MT has several reels, for example around 10, numbered B1 to B10. A reinforcing or strengthening element 3 is coiled on each of reels B1 to B10. One supplementary reel B11 is located upstream of tubular machine MT. The optical transmission cable advances in the upstream-to-downstream direction while it is being produced. On the supplementary reel B11, tube 1 is wound, the optical fibers 2 being arranged inside the latter. If we suppose a is the axis of symmetry of the cylinder constituted by the tubular machines structure, a is also the axis of advancement of the cable while it is being produced. Axis a is shown by dash-dot lines. Downstream of tubular machine MT, there are successively located a capstan C followed by a storage reel BS on which the optical transmission cable is stored. Capstan C along with reels B11 and BS shown in FIG. 2 rotate in a clockwise sense. The axis of reels B1 to B10 is perpendicular to the axis a of tubular machine MT. Tubular machine MT rotates about its axis a in the direction of arrow VR. Between tubular machine MT and capstan C, a pre-shaping head T is located where the conductors F constituted by the strengthening elements 3 and by tube 1 with optical fibers 2 are collected together. When this type of cable is produced using a tubular machine MT, reel B11 of tube 1 with optical fibers 2 is located upstream and externally of tubular machine MT. As tube 1 is unwound, it is guided externally of tubular machine MT along tubular machine MT just like the strengthening elements 3 when they are payed-off from reels B1 to B10. Guiding means, known per se and not illustrated in FIG. 2 for reasons of clarity, ensure such guiding along tubular machine MT. The strengthening elements 3 and tube 1, represented symbolically by the wires F, are collected together at head T for pre-shaping, to form a cable or at least part of the cable where the latter includes several peripheral layers. Upon leaving the pre-shaping head T, the cable then passes over a capstan C before being wound onto storage reel BS.

In a third example of the art, in order to provide an optical transmission cable of which the central tube for the optical fibers has a cross-section distinctly thicker than that of the strengthening elements, it is known to employ a tubular machine having an extended portion at its downstream end, this extended portion containing the large reel intended to receive the tube 1 for optical fibers 2, the tube 1 being arranged at the center of the optical transmission cable thus produced.

In the various examples of the prior art discussed, either the optical transmission cable is of a simple type in other words having a central tube for the optical fibers said cable being able to be produced using a tubular machine, or the optical transmission cable is of a complex type in other words having at least one optical fiber tube which is twisted around a central strengthener element, and said cable is produced using a planetary machine. Now, planetary machines have distinctly lower productivity than tubular machines considering their maximum speed of rotation is distinctly lower than that of tubular machines.

The invention concerns particularly complex type cables in other words those in which the optical fiber tube is twisted about a central strengthening member. For this type of cable which in the prior art was made using a planetary machines, productivity was relatively low. The invention enables this type of complex cable to be produced using a tubular machine which, in view of the relative complexity of such cables, would appear to be reserved for producing simpler cables with a central optical fiber tube.

According to the invention, there is provided a method for producing an optical transmission cable from at least one tube inside of which a plurality of optical fibers are arranged, and strengthening elements, one of the said strengthening elements, constituting a central strengthening member, being arranged at the center of said cable and certain strengthening elements constituting peripheral strengthening members, said at least one tube being twisted about said central strengthening member using a tubular machine so as to form a peripheral layer around said central strengthening member, the peripheral strengthening members and said at least one tube having diameters sufficiently close to each other to ensure said peripheral layer is homogeneous.

For carrying out the method, a tubular machine which in particular is especially suitable for carrying out this method for producing cables with optical fiber tubes twisted around a central reinforcing member is provided. This special tubular machine can nevertheless also be used to provide cables with a central optical fiber tube more readily.

According to the invention, there is consequently also provided a tubular machine for producing an optical transmission cable, said machine having a plurality of reels located inside the tubular machine wherein a greasing tank and a guiding device are provided between said plurality of reels and an end of said tubular machine, arranged whereby a strengthening element unwinding from a reel closest to said greasing tank passes through said greasing tank before exiting at an end of the tubular machine.

The invention will be better understood along with other features and advantages thereof from the detailed description which follows and the drawings, provided by way of example.

FIG. 1 is a diagrammatic view in section of one example of a cable having a peripheral layer and in which the central element is a tube having several optical fibers.

FIG. 2 is a diagrammatic view in profile of a portion of an example of a production line for a cable according to the prior art, using a tubular machine.

FIG. 3 is a diagrammatic view in profile of a portion of an example of a cable production line according to the invention, using a tubular machine of the invention.

FIG. 4 is a diagrammatic view in section of one example of a cable having two peripheral layers and of which the central element is a strengthening member.

FIG. 5 is a diagrammatic view in section of another example of a cable having two peripheral layers and in which the central element is a strengthening member.

FIG. 6 shows detail of FIG. 3, corresponding to that part of tubular machine MT that includes reel B9 and grease tank BG.

To provide optical transmission cables in which the optical fiber tube or tubes is/are twisted about a central strengthening member which itself can be made up of several strengthening elements assembled together, the production method of the invention employs a tubular machine unlike the prior art which used a planetary machine.

Now, planetary machines the diameter of which can be up to 3.5 m, can rotate up to around 100 rpm, whereas tubular machines the diameter of which remains close to 1 m can rotate at up to speeds of the order of 300 to 500 rpm, depending on the case. This much higher speed of rotation allows tubular machines to have considerably better productivity than planetary machines. This gain in productivity is particularly useful in the case of production of aerial or overhead cables in which the twisting pitch around a central member is, on average, distinctly smaller than that of terrestrial or submarine cables. In effect, aerial cables are twisted with a relatively small pitch designed to ensure a certain degree of freedom for the optical fibers contained therein, allowing them to adapt to the pulling stresses to which said cables will be subject once installed, such stresses being distinctly higher than those for terrestrial or submarine cables. Such aerial cables are preferably phase cables or of so-called OPGW (fiber optic cable in overhead ground wire) type. Typically, for a twist pitch of for example 80 mm, the linear production rate of optical transmission cable is around 6 m per minute when a planetary machine is employed and around 24 m per minute when a tubular machine is used, giving a gain in productivity of a factor of around four. The method of the invention can nevertheless also be used with certain terrestrial cables and certain shallow water submarine cables.

Adapting what is shown in FIG. 2, for the case of a tubular machine according to the invention shown in FIG. 3, reel B11 is advantageously deleted and tube 1 is wound on one of reels B1 to B8. The number of reels chosen is just an example and is in no way limiting and in fact depends on the application considered and on the type of optical transmission cable being produced. On reel B9 there is wound the central strengthening member which, when unwinding, passes into grease tank BG using a conventional guiding means known per se to exit at the center of the end of tubular machine MT in the form of a greased strengthening member ECRG. The other portions of FIG. 3 are similar to those discussed in relation with FIG. 2. Instead of unwinding from reel B11 which is no longer necessary, and being guided along tubular machine MT in order to be brought to a central position at pre-shaping head T, the central strengthening member is firstly unwound from a reel located in tubular machine MT according to the invention, for example reel B8, in order to then pass into a greasing tank BG also located in tubular machine MT in order to exit, greased, at the downstream end of tubular machine MT. In the tubular machine of the prior art, the guiding of the central fiber-optic tube along a tubular machine in a guiding device, typically a larger tube, required considerable forces to overcome the friction of the grease in the guiding device. In the tubular machine of the invention however, providing the greasing tank at the downstream end of the tubular machine considerably reduces the path of travel of the greased strengthening member, the strengthening member being preferably the central strengthening member which is consequently well situated at the exit from the tubular machine of the invention, as it is wound from the reel that is closest to the greasing tank and can consequently follow a rectilinear path in its travel up to pre-shaping head T. The tubular machine of the invention shown in FIG. 3 can also be employed for producing optical transmission cables with a fiber-optic central tube; in this case, it is this latter tube which is coiled on reel B9 and which will pass through greasing tank BG before exiting from the end of the tubular machine. Preferably, all the reels of the tubular machine of the invention have the same size so that this tubular machine maintains a constant diameter along its axis a.

FIG. 6 shows detail of FIG. 3, corresponding to that part of tubular machine MT that includes reel B9 and greasing tank BG. Central strengthening member ECR leaves reel B9 having axis A9, runs over a pulley P, travels through greasing tank BG via openings 01 and 02 which preferably are grease-tight to avoid grease flowing outside greasing tank BG. A system of supplementary pulleys leading central strengthening member ECR over grease tank BG would allow openings 01 and 02 to be dispensed with. From this point, central greased strengthening member ECRG leaves tubular machine MT to pass into pre-shaping head T where it is associated with wires F to constitute the cable or cable portion CA.

The invention also provides a system for producing an optical transmission cable carrying at least two peripheral layers, an inner and outer peripheral layer, the outer peripheral layer being twisted about the inner peripheral layer, this system implementing the method of the invention and preferably using the tubular machine of the invention.

Such an example of a cable is notably shown in FIG. 4 which diagrammatically shows a cross-section of one example of such a cable having two peripheral layers and of which the central element is a central strengthening member. The cable has a central strengthening member 4 about which the elements of the inner peripheral layer are twisted, specifically, firstly, tube 1 with optical fibers 2 and, secondly, the strengthening members 3. The outer peripheral layer, specifically strengthening members 5 which can be different from the strengthening members 3, is wound around the inner peripheral layer, and preferably in the reverse direction.

Another example of a cable is notably given in FIG. 5 which shows diagrammatically the cross-section of one example of a cable having two peripheral layers and of which the central member is a strengthening member. The cable comprises central strengthening member 4 about which there are wound inner peripheral layer elements, specifically, firstly, tubes 1 with optical fibers 2 distributed symmetrically at either side of central strengthening member 4 and, secondly, strengthening members 3. The elements of the outer peripheral layer, specifically strengthening members 5 which can be different from the strengthening members 3 are wound about this inner peripheral layer, preferably in the reverse direction.

In one practical example corresponding to the cable illustrated in FIG. 5, the central strengthening member 4 is either aluminum clad steel (ACS) wire or galvanized steel wire of 3.75 mm diameter, the tubes 1 are metal tubes of a diameter between 3 mm and 3.4 mm each comprising 48 optical fibers SMF, the strengthening members 3 are either aluminum clad steel wire or galvanized steel wire of 3.5 mm diameter, and the strengthening members 5 are aluminum alloy (AA) wire of 4 mm diameter.

In this practical example of the cable shown in FIG. 5, the inner peripheral layer was obtained using a tubular machine according to the invention turning at about 300 rpm and the outer peripheral layer was provided using a planetary machine, the tubular machine and the planetary machine being arranged in line one after the other. The two peripheral layers could also be provided using two tubular machines arranged one after the other. This cable could also be produced in two separate steps, where the machines employed, i.e. either two tubular machines or a tubular machine followed by a planetary machine, are not in line one after the other in the cable production plant. In all cases, preferably, the two machines rotate in mutually opposite directions. In the prior art, the type of cable shown in FIG. 5 was produced using a twin cage planetary machine and productivity was then limited by the speed of rotation of the cage which is the slowest in rotation, as well as by the winding pitch.

The invention claimed is:

1. A method for producing an optical transmission cable from at least one tube inside of which a plurality of optical fibers are arranged, and strengthening elements, one of the said strengthening elements, constituting a central strengthening member, being arranged at the center of said cable and certain strengthening elements constituting peripheral strengthening members, said at least one tube being twisted about said central strengthening member using a tubular machine so as to form a peripheral layer around said central strengthening member, the peripheral strengthening members and said at least one tube having diameters sufficiently close to each other to ensure said peripheral layer is homogeneous, wherein the central strengthening member, the at least one tube and the peripheral strengthening members are unwound from respective reels disposed in the tubular machine.

2. The method for producing an optical transmission cable according to claim 1, wherein said central strengthening member passes through a greasing tank situated in said tubular machine, and then exits at an end of said tubular machine.

3. The method for producing an optical transmission cable according to claim 1, wherein the optical transmission cable is an aerial cable.

4. The method for producing an optical transmission cable according to claim 3, wherein the optical transmission cable is a ground or phase cable.

5. The method for producing an optical transmission cable according to claim 1, wherein the strengthening members are made of metal.

6. A tubular machine for producing an optical transmission cable including a central strengthening member, at least one tube inside of which a plurality of optical fibers are arranged and peripheral strengthening elements, said at least one tube and said peripheral strengthening members being wound around said central strengthening member, said machine having a plurality of reels located inside the tubular machine from which said central strengthening member, said at least one tube and said peripheral strengthening members are respectively unwound, wherein a greasing tank and a guiding device are provided between said plurality of reels and an end of said tubular machine, and wherein said central strengthening member is unwound from a reel located closest to said greasing tank and passes through said greasing tank before exiting at an end of the tubular machine.

7. The tubular machine according to claim 6, wherein all of said reels have the same size whereby said tubular machine maintains a constant diameter.

8. The tubular machine according to claim 6, wherein all of said reels have the same size whereby said tubular machine maintains a constant diameter.

9. The tubular machine according to claim 6, wherein the strengthening members are made of metal.

10. A system for producing an optical transmission cable having at least two peripheral layers, comprising an inner peripheral layer and an outer peripheral layer, said outer peripheral layer being twisted about said inner peripheral layer, implementing a method for producing the optical transmission cable from at least one tube inside of which a plurality of optical fibers is arranged, and strengthening elements, one of the said strengthening elements, constituting a central strengthening member, being arranged at the center of said cable and certain strengthening elements constituting peripheral strengthening members, said at least one tube being twisted about said central strengthening member using a tubular machine so as to form the inner peripheral layer around said central strengthening member, the peripheral strengthening members and said at least one tube having diameters sufficiently close to each other to ensure said inner peripheral layer is homogeneous, wherein the central strengthening member, the at least one tube and the peripheral strengthening members associated with the inner peripheral layer are unwound from respective reels disposed in the tubular machine.

11. The system for producing an optical transmission cable according to claim 10 employing, to implement said method, wherein all of said reels have the same size whereby said tubular machine maintains a constant diameter wherein a greasing tank and a guiding device are provided between said reels and an end of said tubular machine, arranged whereby a strengthening element unwinding from a reel closest to said greasing tank passes through said greasing tank before exiting at an end of the tubular machine.

12. The system according to claim 10, wherein the two peripheral layers are provided using two tubular machines arranged one after the other.

13. The system according to claim 12, wherein said two machines rotate in mutually opposite directions.

14. The system according to claim 10, wherein the two peripheral layers are obtained using two separate steps employing two tubular machines.

15. The system according to claim 14, wherein said two machines rotate in mutually opposite directions.

16. The system according to claim 10, wherein the inner peripheral layer is obtained using the tubular machine and said outer peripheral layer is obtained using a planetary machine, the tubular machine and planetary machine being arranged one after the other.

17. The system according to claim 16, wherein said two machines rotate in mutually opposite directions.

18. The system according to claim 10, wherein the said inner peripheral layer is produced during a first step using the tubular machine and said outer peripheral layer is produced during a second step separate from said first step, using a planetary machine.

19. The system according to claim 18, wherein said two machines rotate in mutually opposite directions.

20. The system for producing an optical transmission cable according to claim 10, wherein the strengthening members are made of metal.

\* \* \* \* \*